United States Patent
Yoo et al.

(10) Patent No.: US 11,258,093 B2
(45) Date of Patent: Feb. 22, 2022

(54) ELECTRODE MIXTURE, PREPARATION METHOD THEREOF, AND SECONDARY BATTERY INCLUDING THE SAME

(71) Applicant: LG Chem, Ltd., Seoul (KR)

(72) Inventors: Jung Woo Yoo, Daejeon (KR); Hyeok Moo Lee, Daejeon (KR); Ji Hye Park, Daejeon (KR); Song Taek Oh, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/864,525

(22) Filed: May 1, 2020

(65) Prior Publication Data

US 2020/0266477 A1 Aug. 20, 2020

Related U.S. Application Data

(62) Division of application No. 15/568,641, filed as application No. PCT/KR2016/005543 on May 25, 2016, now Pat. No. 10,680,276.

(30) Foreign Application Priority Data

May 27, 2015 (KR) .......................... 10-2015-0073786

(51) Int. Cl.
  *H01M 10/052* (2010.01)
  *H01M 4/04* (2006.01)
  (Continued)

(52) U.S. Cl.
  CPC ............ *H01M 10/052* (2013.01); *C09C 1/48* (2013.01); *H01M 4/0404* (2013.01); *H01M 4/13* (2013.01);
  (Continued)

(58) Field of Classification Search
  CPC .................................................. H01M 10/052
  See application file for complete search history.

(56) References Cited

U.S. PATENT DOCUMENTS

2003/0054243 A1 3/2003 Suzuki et al.
2004/0023116 A1 2/2004 Fujino et al.
(Continued)

FOREIGN PATENT DOCUMENTS

CN 1949561 A 4/2007
CN 102054972 A 5/2011
(Continued)

OTHER PUBLICATIONS

International Search Report (PCT/ISA/210) issued in PCT/KR2016/005543, dated Aug. 8, 2015.
(Continued)

*Primary Examiner* — Brian R Ohara
(74) *Attorney, Agent, or Firm* — Lerner, David, Littenberg, Krumholz & Mentlik, LLP

(57) ABSTRACT

An electrode mixture of the present invention comprises: an electrode active material; a binder; and a conductive material. When a cross-section of the electrode mixture is imaged such that a pixel filled 100% with a conductive material among a plurality of divided pixels is considered to be a condensed pixel and a value obtained by counting condensed pixels is considered to be the degree of agglomeration, the degree of agglomeration of a conductive material in the electrode mixture in the depth direction of the electrode mixture has a standard deviation less than 3.0. The electrode mixture as described above includes a conductive material uniformly distributed therein and thus has low electrode resistance. Therefore, the electrode mixture can improve output and lifespan properties of a lithium secondary battery to which the electrode mixture has been applied.

5 Claims, 6 Drawing Sheets

(51) Int. Cl.
   H01M 4/13      (2010.01)
   H01M 4/1391    (2010.01)
   H01M 4/485     (2010.01)
   H01M 4/62      (2006.01)
   H01M 10/0525   (2010.01)
   H01M 4/02      (2006.01)
   C09C 1/48      (2006.01)
   H01M 4/131     (2010.01)

(52) U.S. Cl.
   CPC ......... *H01M 4/131* (2013.01); *H01M 4/1391* (2013.01); *H01M 4/485* (2013.01); *H01M 4/622* (2013.01); *H01M 4/625* (2013.01); *G06T 2207/20021* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2005/0198815 A1 | 9/2005 | Suzuki et al. | |
| 2008/0003500 A1* | 1/2008 | Issaev | H01M 4/5815 429/200 |
| 2008/0311471 A1 | 12/2008 | Suzuki et al. | |
| 2010/0167118 A1* | 7/2010 | Liu | H01M 10/0525 429/163 |
| 2010/0230641 A1 | 9/2010 | Oki et al. | |
| 2011/0159360 A1 | 6/2011 | Hirota et al. | |
| 2012/0119155 A1 | 5/2012 | Liu et al. | |
| 2013/0130113 A1 | 5/2013 | Takano et al. | |

FOREIGN PATENT DOCUMENTS

| | | | |
|---|---|---|---|
| EP | 2296208 A1 | 3/2011 | |
| JP | H10255844 A | 9/1998 | |
| JP | 2002260662 A | 9/2002 | |
| JP | 2003123764 A | 4/2003 | |
| JP | 2003163006 A | 6/2003 | |
| JP | 2006134716 A | 5/2006 | |
| JP | 200926744 A | 2/2009 | |
| JP | 2012221568 A | 11/2012 | |
| JP | 201337955 A | 2/2013 | |
| JP | 201389346 A | 5/2013 | |
| JP | 2013254699 A | 12/2013 | |
| JP | 5614592 B2 | 10/2014 | |
| JP | 2014241279 A | 12/2014 | |
| JP | 201553125 A | 3/2015 | |
| KR | 100274888 B1 | 2/2001 | |
| KR | 20090016734 A | 2/2009 | |
| KR | 20130037245 A | 4/2013 | |

OTHER PUBLICATIONS

European Search Report for Appln. No. 16800305.1 dated Feb. 23, 2018.

Chinese Search Report for Application No. 2016800265512 dated Mar. 10, 2020, 2 pages.

* cited by examiner

ELECTRODE MIXTURE, PREPARATION METHOD THEREOF, AND SECONDARY BATTERY INCLUDING THE SAME

CROSS-REFERENCE TO RELATED APPLICATION

This application is a divisional of U.S. application Ser. No. 15/568,641 filed Oct. 23, 2017, which is a national phase entry under 35 U.S.C. § 371 of International Application No. PCT/KR2016/005543, filed May 25, 2016 which claims priority to Korean Patent Application No. 10-2015-0073786, filed May 27, 2015, the disclosures of which are incorporated herein by reference.

TECHNICAL FIELD

The present invention relates to an electrode mixture having a low degree of agglomeration of a conductive material and a secondary battery including the same, and more particularly, to a method of preparing an electrode mixture capable of lowering a degree of agglomeration of a conductive material.

BACKGROUND ART

As technology development and demand for mobile devices increase, demand for a secondary battery as an energy source is rapidly increasing, and a lithium secondary battery having high energy density and voltage among such secondary batteries has been commercialized and widely used.

In a lithium secondary battery, a lithium metal oxide is used as a positive electrode active material, and lithium metal, a lithium alloy, crystalline or amorphous carbon or a carbon composite is used as a negative electrode active material. The active material is applied on a current collector so as to have an appropriate thickness and length or the active material itself is applied in a film form, and then is wound or laminated together with a separator which is an insulator to prepare an electrode group. Then, the electrode group is put into a can or a similar container, and then an electrolyte solution is injected to manufacture a secondary battery.

A $LiNiO_2$-based positive electrode active material has a relatively low cost and exhibits battery characteristics such as high discharge capacity, but a phase transition of a crystalline structure occurs according to a change in volume during charge and discharge cycles, and stability is rapidly degraded when the $LiNiO_2$-based positive electrode active material is exposed to air and moisture.

In addition, lithium manganese oxides such as $LiMnO_2$, $LiMn_2O_4$ and the like exhibit excellent thermal stability and have a low cost, but exhibit low capacity, poor cycle characteristics and poor high-temperature characteristics.

Among such lithium manganese oxides, spinel $LiMn_2O_4$ exhibits a relatively even electric potential in the 4V region (3.7 to 4.3 V) and 3V region (2.7 to 3.1 V). However, since cycle and storage characteristics are significantly degraded in the 3V region, the spinel $LiMn_2O_4$ is known to be difficult to use. The reason may be a phenomenon in which the spinel $LiMn_2O_4$ is present in a single-phase of a cubic phase in the 4V region, and is changed to a two-phase of a cubic phase and a tetragonal phase in the 3V region by a phase transition of Jahn-Teller distortion and a phenomenon in which manganese is eluted in an electrolyte solution. For this reason, when the spinel lithium manganese oxide in the 3V region is used, an actual capacity is generally lower than a theoretical capacity, and rate capability is also low.

Accordingly, studies on a positive electrode active material of a lithium secondary battery having excellent capacity and output characteristics in high voltage and general voltage regions have been conducted. A lithium manganese positive electrode active material can provide a lithium secondary battery having high energy and high capacity and exhibiting excellent capacity and lifespan characteristics in a wide region of 2 to 4.6 V.

However, a Mn-rich-based positive electrode active material must undergo a high-voltage activation process and be used in a high-voltage range to express high capacity. However, when a battery is driven at high voltage, a side reaction of an active material and an electrolyte solution is highly likely to occur, and manganese of a positive electrode material is easily eluted and thus eluted manganese is deposited on a negative electrode material. Therefore, performance of a lithium secondary battery may be finally degraded to shorten a lifetime.

Accordingly, conventionally, $LiBF_4$ was used as an electrolyte solution additive to improve characteristics of a lithium secondary battery to which a Mn-rich-based positive electrode active material is applied, or LiBOB was used to prevent degradation of a lifetime of a lithium secondary battery caused by elution of manganese by a lithium salt such as $LiPF_6$ generating hydrofluoric gas.

However, $LiBF_4$ causes degradation of ion conductivity and thus the resistance of a battery increases, and LiBOB is disadvantageous in terms of cost and thus has been a problem in mass production of batteries. Accordingly, it is necessary to develop a non-aqueous electrolyte solution that can normally exhibit high-capacity characteristics of a Mn-rich-based positive electrode active material and can prevent the above problems.

DISCLOSURE OF THE INVENTION

Technical Problem

The present invention is directed to providing an electrode mixture having a low degree of agglomeration of a conductive material in an electrode mixture by using an appropriate conductive material, pre-dispersing a conductive material upon preparation of a slurry and appropriately controlling a drying temperature, to lower the resistance of an electrode including the same, and finally to improve the lifespan and output characteristics of a secondary battery.

Technical Solution

According to an embodiment of the present invention, there is provided an electrode mixture which includes an electrode active material; a binder; and a conductive material, wherein, when a cross-section of the electrode mixture is imaged such that a pixel filled 100% with the conductive material among a plurality of divided pixels is considered to be a condensed pixel and a value obtained by counting condensed pixels is considered to be a degree of agglomeration, a degree of agglomeration of the conductive material in the electrode mixture in a depth direction of the electrode mixture has a standard deviation of less than 3.0.

In an embodiment, a maximum degree of agglomeration of the conductive material may be less than 10.

In an embodiment, the conductive material may have a DBP absorption amount of 150 to 400 ml/100 g.

In an embodiment, the conductive material may have a particle diameter of 10 to 100 nm.

In an embodiment, the conductive material may have a BET specific surface area of 50 to 500 $m^2/g$.

In an embodiment, the conductive material may be any one selected from the group consisting of acetylene black, Ketjenblack, channel black, furnace black, lamp black, thermal black and a combination thereof.

In an embodiment, the binder may be any one selected from the group consisting of polyvinylidene fluoride (PVDF), polyvinyl alcohol (PVA), carboxymethyl cellulose (CMC), starches, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber, fluoro rubber and a combination thereof.

In an embodiment, the electrode active material may be a positive electrode active material, and the positive electrode active material may include any one selected from the group consisting of lithium cobalt-based oxides, lithium nickel-based oxides, lithium manganese-based oxides, lithium copper-based oxides, vanadium-based oxides and lithium nickel-manganese-cobalt-based composite oxides.

In an embodiment, the electrode mixture may have a thickness of 20 to 150 μm.

According to another embodiment of the present invention, there is provided a method of preparing an electrode mixture, which includes preparing a pre-dispersed slurry by mixing a binder and a conductive material with an organic solvent; preparing an electrode slurry by adding an electrode active material to the pre-dispersed slurry; applying the electrode slurry on a current collector; and drying the electrode slurry applied on the current collector, wherein, when a cross-section of the electrode mixture is imaged such that a pixel filled 100% with the conductive material among a plurality of divided pixels is considered to be a condensed pixel and a value obtained by counting condensed pixels is considered to be a degree of agglomeration, a degree of agglomeration of the conductive material in the electrode mixture has a standard deviation of less than 3.0.

In an embodiment, the pre-dispersed slurry may have a solid content of 5 to 15 wt %.

In an embodiment, the electrode slurry may have a solid content of 50 to 70 wt %.

In an embodiment, the drying may be performed at 110 to 150° C.

In an embodiment, the drying may be performed at 120 to 140° C.

According to still another embodiment of the present invention, there is provided an electrode for a secondary battery which includes the above-described electrode mixture.

According to yet another embodiment of the present invention, there is provided a lithium secondary battery which includes a positive electrode; a negative electrode; and a separator interposed between the positive electrode and the negative electrode, wherein the positive electrode is the above-described electrode for a secondary battery.

Advantageous Effects

A lithium secondary battery according to the present invention can provide an electrode mixture including a conductive material uniformly distributed therein, which is prepared by using an appropriate conductive material, pre-dispersing a conductive material upon preparation of an electrode mixture and appropriately controlling a drying temperature. Also, when such an electrode mixture is applied to a lithium secondary battery, a lithium secondary battery having improved output and lifespan characteristics can be provided.

MODE FOR CARRYING OUT THE INVENTION

Examples

Figure 1:
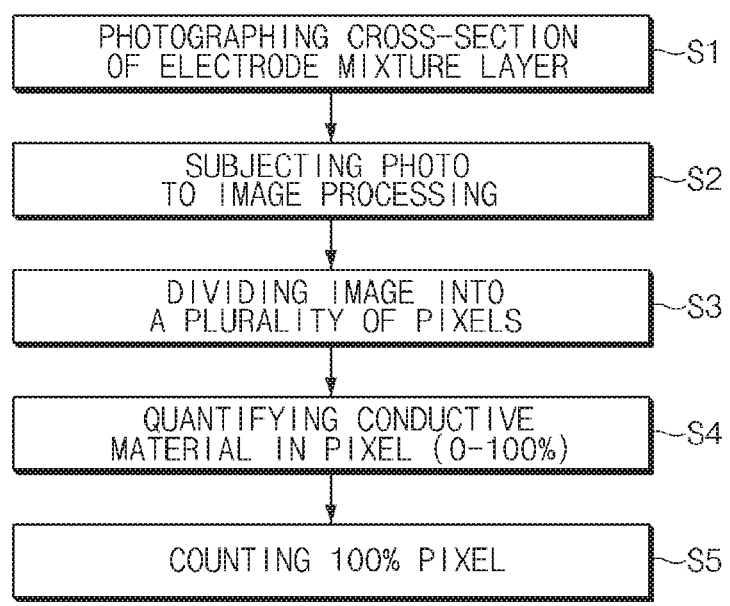
FIG. 1 is a flowchart schematically illustrating a method of evaluating a degree of agglomeration of a conductive material according to an embodiment of the present invention.

Hereinafter, exemplary embodiments of the present invention will be described in detail with reference to the accompanying drawings so that those of ordinary skill in the art can carry out the present invention. However, it should be understood that the present invention can be implemented in various forms, and is not intended to be limited to the exemplary embodiments of the present invention.

Example 1

1) Preparation of positive electrode mixture Based on a total weight of a positive electrode slurry, 4 wt % of acetylene black having a particle diameter of 25 nm, a DBP absorption amount of 267 ml/100 g and a BET specific surface area of 135 $m^2/g$ as a conductive material and 4 wt % of PVDF as a binder were added to a NMP solvent, mixed and dispersed, thereby preparing a pre-dispersed slurry having a solid content of about 10%. The pre-dispersed slurry was mixed with 92 wt % of NMC as a positive electrode active material, thereby preparing a final positive electrode slurry having a solid content of about 65%.

The positive electrode slurry was applied on an aluminum foil-based positive electrode current collector and dried at about 120° C. Afterward, the resulting material was pressed in such a way that the positive electrode mixture and the positive electrode current collector had a total thickness of about 50 μm.

2) Manufacture of Lithium Secondary Battery

The positive electrode prepared in the process 1) was used to manufacture a lithium secondary battery. Natural graphite as a negative electrode active material of the lithium secondary battery, an electrolyte solution in which 1 M $LiPF_6$ was dissolved in a carbonate electrolyte solution, and a separator composed of three layers of polypropylene/polyethylene/polypropylene (PP/PE/PP) were used.

Comparative Example 1

A lithium secondary battery was manufactured in the same manner as in Example 1 except that a conductive material and a binder were dispersed and mixed together with a positive electrode active material in a NMP solvent without pre-dispersion of a conductive material and a binder upon preparation of a positive electrode slurry.

Example 2-1

A lithium secondary battery was manufactured in the same manner as in Example 1 except that a slurry was applied and dried at 130° C. upon preparation of a positive electrode mixture.

Example 2-2

A lithium secondary battery was manufactured in the same manner as in Example 1 except that a slurry was applied and dried at 140° C. upon preparation of a positive electrode mixture.

Example 2-3

A lithium secondary battery was manufactured in the same manner as in Example 1 except that a slurry was applied and dried at 110° C. upon preparation of a positive electrode mixture.

Comparative Example 2-1

A lithium secondary battery was manufactured in the same manner as in Example 1 except that a slurry was applied and dried at 160° C. upon preparation of a positive electrode mixture.

Comparative Example 2-2

A lithium secondary battery was manufactured in the same manner as in Example 1 except that a slurry was applied and dried at 90° C. upon preparation of a positive electrode mixture.

Example 3-1

A lithium secondary battery was manufactured in the same manner as in Example 1 except that acetylene black having a BET specific surface area of 50 $m^2/g$, a DBP absorption amount of 250 ml/100 g and a particle diameter of 30 nm was used as a conductive material.

Example 3-2

A lithium secondary battery was manufactured in the same manner as in Example 1 except that acetylene black having a BET specific surface area of 377 $m^2/g$, a DBP absorption amount of 290 ml/100 g and a particle diameter of 20 nm was used as a conductive material.

Example 3-3

A lithium secondary battery was manufactured in the same manner as in Example 1 except that acetylene black having a BET specific surface area of 58 $m^2/g$, a DBP absorption amount of 218 ml/100 g and a particle diameter of 35 nm was used as a conductive material.

Comparative Example 3-1

A lithium secondary battery was manufactured in the same manner as in Example 1 except that acetylene black having a BET specific surface area of 45 $m^2/g$, a DBP absorption amount of 177 ml/100 g and a particle diameter of 35 nm was used as a conductive material.

Experiment Method

1) Method of Evaluating Degree of Agglomeration of Conductive Material

Using Raman spectroscopy, across-section of the prepared positive electrode mixture layer was photographed in a depth direction, and the photo was subjected to image processing to divide the cross-section into a total of 2,080 pixels. Then, a conductive material which fills each pixel thus divided was quantified in a range of 0 to 100%, and the 100% pixels were counted, the resulting value of which was considered to be a degree of agglomeration of a conductive material.

2) Method of Measuring Resistance

For each of the secondary batteries according to Examples and Comparative Examples, cell resistance at a state of charge (SOC) of 20 and 50% was measured at room temperature.

Experimental Example 1: Evaluation of Degree of Agglomeration and Electrode Resistance According to a Dispersion Method 1) Degree of Agglomeration of Conductive Material According to the above-described evaluation method, a degree of agglomeration of a conductive material in each positive electrode mixture according to Example 1 and Comparative Example 1 was evaluated, results of which are shown in FIGS. 3 and 4.

Figure 3:
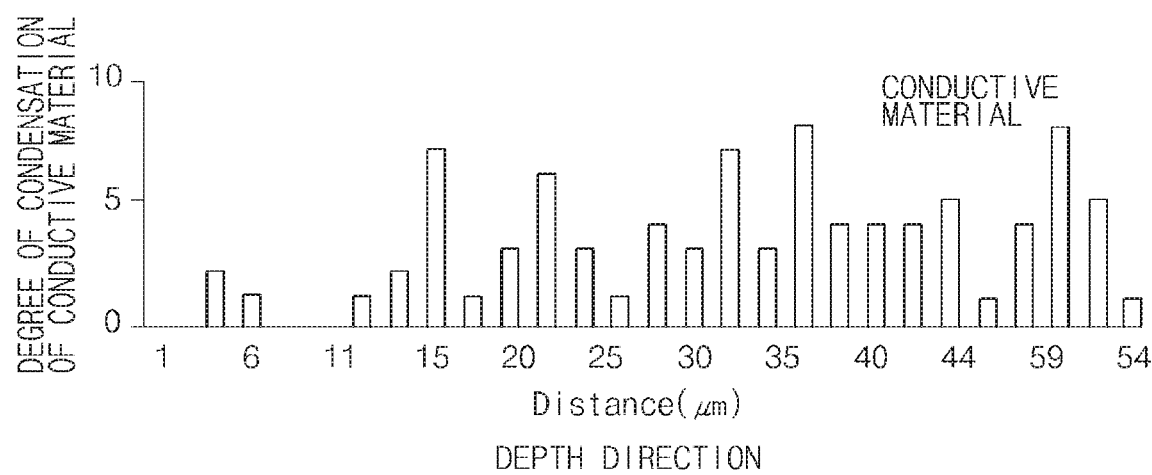
FIG. 3 is a graph illustrating a result obtained by evaluating a degree of agglomeration of a conductive material in an electrode mixture prepared by a method of preparing an electrode mixture according to an embodiment of the present invention.
Figure 4:
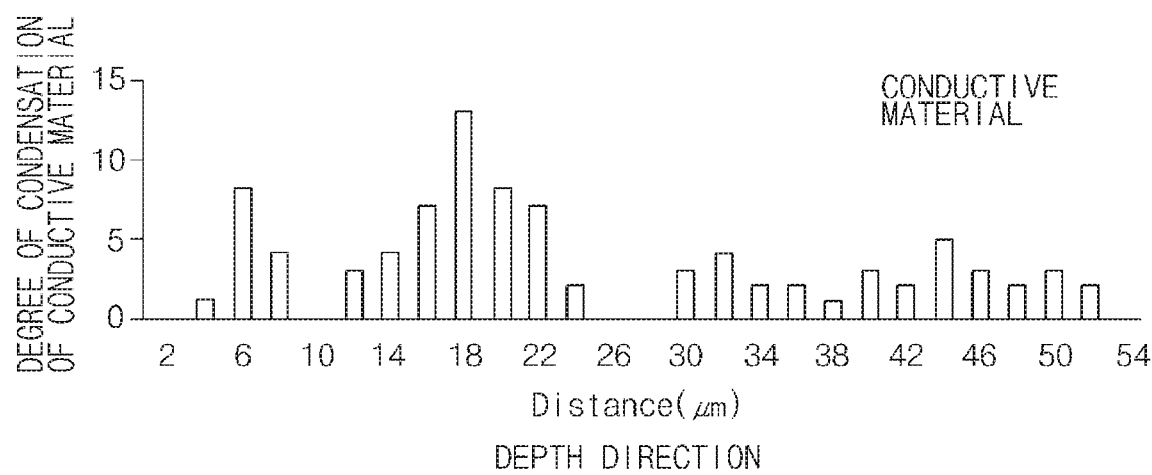
FIG. 4 is a graph illustrating a result obtained by evaluating a degree of agglomeration of a conductive material in an electrode mixture prepared by a typical method.

Referring to FIGS. 3 and 4, it can be confirmed that a conductive material was significantly uniformly distributed in a positive electrode mixture in the case of Example 1 (see FIG. 3) because a maximum degree of agglomeration of a conductive material was less than 10, that is, about 7 to 8, and a degree of agglomeration according to depth was uniformly distributed within about 5 and had a standard deviation of less than 2.4. However, it can be confirmed that a conductive material was relatively non-uniformly distributed in a positive electrode mixture in the case of Comparative Example 1 (see FIG. 4) because a maximum degree of agglomeration of a conductive material is greater than 10, and a degree of agglomeration according to depth had a standard deviation of greater than 3.0. Through these results, it can be confirmed that a degree of agglomeration of a conductive material may be differently distributed according to whether or not a conductive material and binder were pre-dispersed by mixing a positive electrode active material later.

2) Electrode Resistance of Secondary Battery

According to the above-described evaluation method, the electrode resistance of each secondary battery according to Example 1 and Comparative Example 1 was measured, results of which are shown in the following Table 1.

TABLE 1

| | BET m²/g | DBP ml/100 g | Particle diameter nm | Drying Temp °C. | Pre-dispersion | Degree of agglomeration | Resistance at SOC of 50% (25° C.) Ohm | Resistance at SOC of 20% (25° C.) Ohm |
|---|---|---|---|---|---|---|---|---|
| Example 1 | 135 | 267 | 25 | 120 | ○ | 2.4 | 1.55 | 1.67 |
| Comparative Example 1 | 135 | 267 | 25 | 120 | X | 3.0 | 1.61 | 1.91 |

Referring to Table 1, it can be confirmed that when a positive electrode is prepared by preparing a positive electrode slurry by mixing a positive electrode active material after pre-dispersion of a conductive material and a binder, a conductive material may be uniformly dispersed in a positive electrode mixture, a resistance value at SOC of 20%, at which resistance of a positive electrode active material is rapidly increased at room temperature according to uniform dispersion of a conductive material, may be decreased, and a positive electrode prepared through pre-dispersion of a conductive material and a binder has a relatively low resistance even at a low temperature of −30° C.

Experimental Example 2: Degree of Agglomeration and Electrode Resistance According to Drying Temperature of Positive Electrode Mixture Layer According to the above-described evaluation method, the degree of agglomeration and electrode resistance of each secondary battery according to Examples 2-1 to 2-3 and Comparative Examples 2-1 and 2-2 were evaluated, results of which are shown in the following Table 2.

TABLE 2

| | BET m²/g | DBP ml/100 g | Particle diameter nm | Drying temp. °C. | Pre-dispersion | Degree of agglomeration | Resistance at SOC of 50% (25° C.) Ohm | Resistance at SOC of 20% (25° C.) Ohm |
|---|---|---|---|---|---|---|---|---|
| Example 1 | 135 | 267 | 25 | 120 | ○ | 2.4 | 1.55 | 1.67 |
| Example 2-1 | 135 | 267 | 25 | 130 | ○ | 2.7 | 1.56 | 1.75 |
| Example 2-2 | 135 | 267 | 25 | 140 | ○ | 2.9 | 1.62 | 1.95 |
| Example 2-3 | 135 | 267 | 25 | 110 | ○ | 2.3 | 1.57 | 1.68 |

TABLE 2-continued

| | BET $m^2/g$ | DBP ml/100 g | Particle diameter nm | Drying temp. °C. | Pre-dispersion | Degree of agglomeration | Resistance at SOC of 50% (25° C.) Ohm | Resistance at SOC of 20% (25° C.) Ohm |
|---|---|---|---|---|---|---|---|---|
| Comparative Example 2-1 | 135 | 267 | 25 | 160 | ○ | 3.1 | 1.78 | 2.1 |
| Comparative Example 2-2 | 135 | 267 | 25 | 90 | ○ | 2.3 | 1.82 | 2.4 |

Referring to Table 2, It can be seen that a conductive material was significantly uniformly distributed in a mixture layer in the case of Example 1 and Examples 2-1 to 2-3 in which a positive electrode mixture layer was dried at 110 to 150° C. because a degree of agglomeration of a conductive material had a standard deviation of less than 3.0. However, it can be confirmed that a degree of agglomeration had a standard deviation of greater than 3.0, which is greater than a value indicating that a conductive material was uniformly distributed, in the case of Comparative Example 2-1 in which a positive electrode mixture layer was dried at a temperature greater than 150° C., that is, 160° C.

In addition, it can be confirmed through Table 2 that electrode resistance was relatively high at SOC of both 20 and 50% in the case of Comparative Example 2-1, compared to Examples 2-1 to 2-3, and resistance was relatively high because the drying was not sufficiently performed in the case of Comparative Example 2-2 in which the drying was performed at the lower temperature.

Through these results, it was confirmed that when a positive electrode mixture layer was dried at a drying temperature of about 110 to 150° C., both a degree of agglomeration of a conductive material in a positive electrode mixture layer and the resistance of the electrode including the prepared mixture layer were excellent.

Experimental Example 3: Degree of Agglomeration and Electrode Resistance According to Property of Conductive Material According to the above-described evaluation method, the degree of agglomeration and electrode resistance of each secondary battery according to Examples 3-1 to 3-3 and Comparative Example 3-1 were evaluated, results of which are shown in the following Table 3.

TABLE 3

| | BET $m^2/g$ | DBP ml/100 g | Particle diameter nm | Drying temp. °C. | Pre-dispersion | Degree of agglomeration | Resistance at SOC of 50% (25° C.) Ohm | Resistance at SOC of 20% (25° C.) Ohm |
|---|---|---|---|---|---|---|---|---|
| Example 1 | 135 | 267 | 25 | 120 | ○ | 2.4 | 1.55 | 1.67 |
| Example 3-1 | 50 | 250 | 30 | 120 | ○ | 2.7 | 1.56 | 1.75 |
| Example 3-2 | 377 | 290 | 20 | 120 | ○ | 2.9 | 1.62 | 1.95 |
| Example 3-3 | 58 | 218 | 35 | 120 | ○ | 2.3 | 1.57 | 1.68 |
| Comparative Example 3-1 | 45 | 177 | 50 | 120 | ○ | 3.1 | 1.78 | 2.1 |

Referring to Table 3, it was confirmed that a degree of agglomeration had a standard deviation of less than 3.0, and electrode resistance also was relatively low in the case of Examples 3-1 to 3-3 in which properties of a conductive material were freely changed, and a BET specific surface area, a DBP absorption amount and a particle diameter all were within recommended ranges.

However, it can be confirmed that a BET specific surface area was 45 $m^2/g$ which is a value less than a lower limit value, a degree of agglomeration also had a standard deviation of greater than 3.0, and electrode resistance also was relatively high in the case of Comparative Example 3-1, compared to Examples 3-1 to 3-3.

Through these results, it was confirmed that properties of a conductive material such as BET specific surface area, DBP absorption amount and particle diameter can be selected within appropriate value ranges, but when values outside value ranges recommended in the present invention are selected, a degree of agglomeration of a conductive material of a positive electrode mixture layer and electrode resistance were poor The exemplary embodiments of the present invention have been described in detail above. However, the scope of the present invention is not limited thereto, and encompasses several modifications and improvements by those skilled in the art using basic concepts of embodiments of the present invention defined by the appended claims Hereinafter, the present invention will be described in more detail to help in understanding the present invention. Terms and words used in this specification and claims should not be interpreted as limited to commonly used meanings or meanings in dictionaries and should be interpreted with meanings and concepts which are consistent with the technological scope of the present invention based on the principle that the inventors have appropriately defined concepts of terms in order to describe the present invention in the best way.

According to an embodiment of the present invention, there is provided an electrode mixture which includes an electrode active material; a binder; and a conductive material, wherein, when a cross-section of the electrode mixture is imaged such that a pixel filled 100% with the conductive material among a plurality of divided pixels is considered to be a condensed pixel and a value obtained by counting condensed pixels is considered to be a degree of agglomeration, a degree of agglomeration of the conductive material in the electrode mixture in a depth direction of the electrode mixture has a standard deviation of less than 3.0.

The electrode mixture according to an embodiment of the present invention includes an electrode active material, a binder and a conductive material. A degree of agglomeration of the conductive material may have a low standard deviation of less than 3.0, a maximum degree of agglomeration may be less than 10, and such a conductive material may be significantly uniformly distributed in the electrode mixture.

The degree of agglomeration of a conductive material may be evaluated by various methods, but a method of evaluating a degree of agglomeration of a conductive material used in the present invention will be described with reference to the description schematically illustrated in FIGS. 1 and 2 as follows.

FIG. 1 is a flowchart illustrating order of a method of evaluating a degree of agglomeration of a conductive material. First, a cross-section of an electrode mixture layer including a conductive material is photographed (S1), the photo is subjected to image processing (S2) so that the cross-section of an electrode mixture is divided into a plurality of pixels (S3). Here, the cross-section of an electrode mixture layer may generally refer to a cross-section in a depth direction when the center is cleaved. Next, pixels filled with a conductive material among a plurality of divided pixels are counted (S5) In this case, after a degree to which each pixel is filled with a conductive material is quantified in a range of 0 to 100% (S4), only pixels which are filled 100% with a conductive material are counted as pixels in which a conductive material is condensed. In this case, a value obtained by counting condensed pixels may be a degree of agglomeration of a conductive material of an electrode mixture.

Figure 2A:
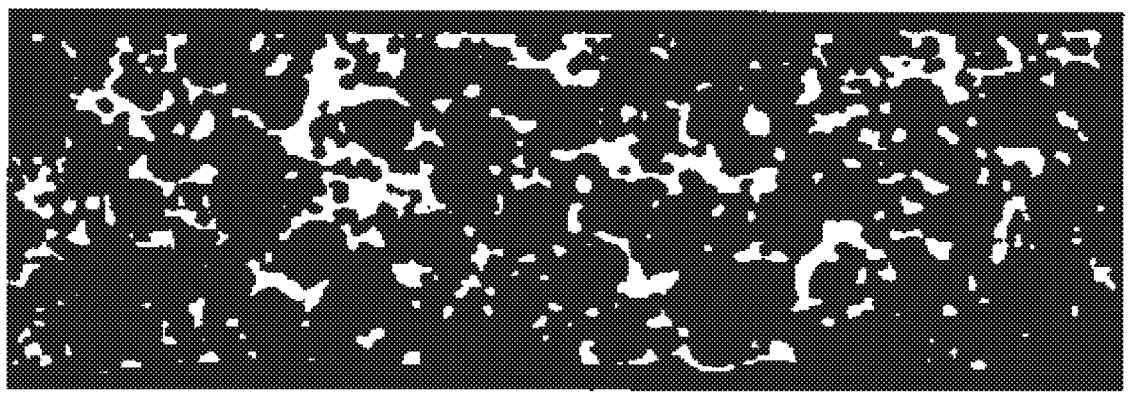
FIGS. 2A to 2C show a photo obtained by photographing a cross-section of an electrode mixture according to FIG. 1 (FIG. 2A), an image obtained by subjecting the photo to image processing to divide the cross-section into a plurality of pixels (FIG. 2B), and a diagram illustrating that a conductive material in each pixel is quantified and counted (FIG. 2C).
Figure 2B:
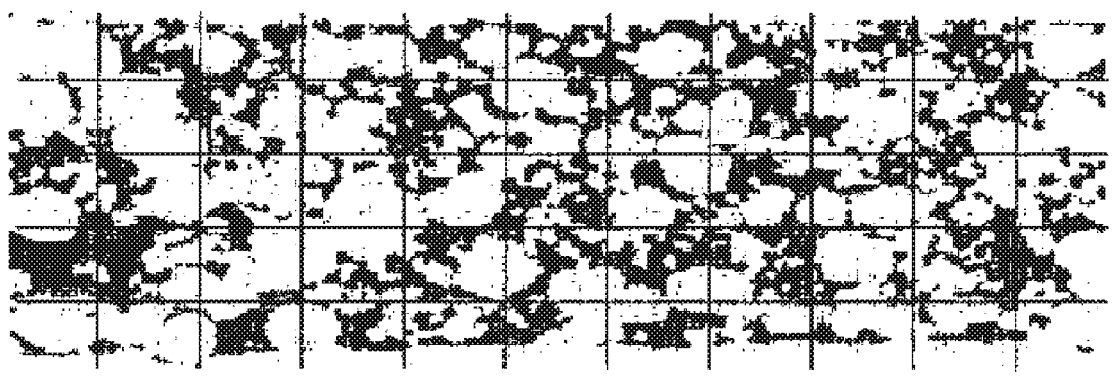
Figure 2C:
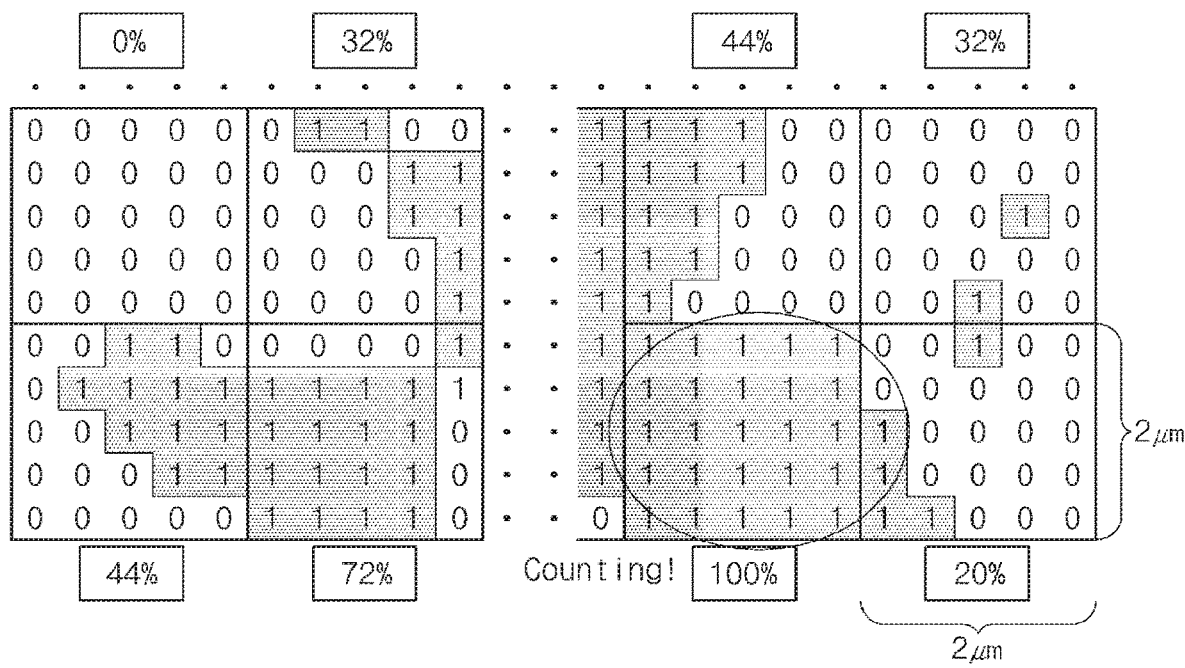

FIGS. 2A to 2C show an embodiment of the method of evaluating a degree of agglomeration of a conductive material according to the present invention according to the flowchart of FIG. 1. However, the method of evaluating a degree of agglomeration of a conductive material according to the present invention is not limited thereto.

FIG. 2A is a photo obtained by photographing a cross-section of an electrode mixture, and FIG. 2B is an image obtained by subjecting the photo to image processing to divide the cross-section into a plurality of pixels. In addition, FIG. 2C is an example illustrating that a degree to which each pixel is filled with a conductive material is quantified, and may be an exemplary image illustrating that a degree of agglomeration of a conductive material in each pixel is quantified in a range of 0 to 100%.

Specifically, when the method of evaluating a degree of agglomeration of a conductive material is actually applied with reference to FIG. 2, a cross-section of an electrode mixture may be photographed using Raman spectroscopy as shown in FIG. 2A, but the present invention is not limited thereto, and any method by which the presence and absence of a specific material can be identified in a shade like Raman spectroscopy may be applied as the method of evaluating a degree of agglomeration according to the present invention.

In addition, the plurality of divided pixels in FIG. 2B may number about 1,000 or more, preferably 2,000 or more, and each of the plurality of divided pixels may have a shape of a square having a length of about 0.1 to 4 μm on one side (see FIG. 2C).

Additionally, when a degree to which each pixel is filled with a conductive material is quantified, as shown in FIG. 2C, each pixel may be divided again into 25, 36 or 100 smaller pixels to convert a degree to which each pixel is filled with a conductive material into a percentage.

When such a method of evaluating a degree of agglomeration of a conductive material is used, it is possible to relatively accurately determine a degree of dispersion of a conductive material and to determine a degree of agglomeration of a conductive material according to depth.

In addition, in order to more accurately evaluate a degree of agglomeration, the number of pixels to be divided may be further increased, the number of pixels to be divided again may be further increased when each pixel is divided into smaller pixels, and cross-sections of various portions are photographed when a cross-section is photographed through Raman spectroscopy, the processes are repeated, and then an average resulting value may be used to reduce an error.

A degree of agglomeration of a conductive material evaluated as described above is preferable as a standard deviation is low and a maximum value is low. Therefore, a secondary battery including an electrode containing a conductive material whose degree of agglomeration has a low standard deviation and low maximum value may have significantly improved resistance characteristics, and accordingly, output and lifespan characteristics may be improved.

Required factors for lowering the standard deviation and maximum value of a degree of agglomeration of a conductive material may vary. As one of them, by selecting a substance in which properties of a conductive material is appropriately adjusted, a degree of agglomeration of a conductive material can be adjusted.

According to the present invention, the conductive material may have properties with values in specific ranges. The conductive material may have a DBP absorption amount of 150 to 400 ml/100 g. The DBP absorption amount is a parameter that can be changed according to a secondary structure of the conductive material, and is higher as the secondary structure is developed. Also, when a DBP absorption amount is within the above range, the dispersion of a conductive material may be further improved.

In addition, the conductive material may have a particle diameter of 10 to 100 nm and a BET specific surface area of 50 to 500 $m^2/g$.

The conductive material may be generally included at 1 to 50 wt %, 1 to 20 wt %, and preferably 1 to 10 wt % with respect to a total weight of the electrode mixture. Such a conductive material is not particularly limited as long as it does not cause a chemical change in the battery and has conductivity. For example, the conductive material may be graphite such as natural graphite, artificial graphite or the like; carbon black such as acetylene black, Ketjen black, channel black, furnace black, lamp black, thermal black or the like; a conductive fiber such as carbon fiber, metallic fiber or the like; metallic powder such as carbon fluoride powder, aluminum powder, nickel powder or the like; a conductive whisker such as zinc oxide, potassium titanate or the like; a conductive oxide such as titanium oxide or the like; or a conductive material such as a polyphenylene derivative or the like.

However, although the conductive material applied to the electrode mixture according to the present invention is not particularly limited as long as it is generally applicable to an electrode of a lithium secondary battery as described above, it is more preferable to use a particulate conductive material than a linear conductive material, and to use a conductive material such as carbon black among particulate conductive materials. For example, it is preferable to use acetylene black, Ketjen black, channel black, furnace black, lamp black, thermal black or a combination thereof.

In addition, the binder, like the conductive material, is not particularly limited as long as it can be applied to an electrode of a lithium secondary battery, and may be generally included at 1 to 50 wt %, 1 to 20 wt %, and preferably 1 to 10 wt % with respect to a total weight of the electrode mixture. For example, the binder may be polyvinylidene fluoride (PVDF), polyvinyl alcohol (PVA), carboxymethyl cellulose (CMC), starches, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber, fluoro rubber and a combination thereof.

Considering that the electrode mixture according to an embodiment of the present invention is preferably a positive electrode mixture, the electrode active material may also preferably be a positive electrode active material, and may be generally included at 50 to 99 wt %, 70 to 95 wt %, and preferably 85 to 95 wt % with respect to a total weight of the electrode mixture.

The positive electrode active material may be, for example, a layered compound such as lithium cobalt oxide ($LiCoO_2$), lithium nickel oxide ($LiNiO_2$) or the like, or a compound substituted with one or more transition metals; lithium manganese oxides ($LiMnO_2$) such as a compound represented by $Li_{1+x}Mn_{2-x}O_4$ (here, x is 0 to 0.33), $LiMnO_3$, $LiMn_2O_3$, $LiMnO_2$ or the like; lithium copper oxide ($Li_2CuO_2$); a vanadium oxide such as $LiV_3O_8$, $LiFe_3O_4$ $V_2O_5$, $Cu_2V_2O_7$ or the like; a lithium nickel oxide represented by $LiNi_{1-x}MxO_2$ (here, M=Co, Mn, Al, Cu, Fe, Mg, B or Ga, x=0.01 to 0.3); a lithium manganese composite oxide represented by $LiMn_{2-x}M_xO_2$ (here, M=Co, Ni, Fe, Cr, Zn or Ta, x=0.01 to 0.1) or $Li_2Mn_3MO_8$ (here, M=Fe, Co, Ni, Cu or Zn); $LiMn_2O_4$ in which some of the lithium atoms are substituted with alkaline earth metal ions; a disulfide compound; or a compound whose main component is a lithium intercalation material such as a composite oxide formed of $Fe_2(MoO_4)_3$ or a combination thereof. However, ternary blended lithium composite oxides such as NMC, Mn-rich-based NMC, Ni-rich-based NMC and the like may be more preferably used.

Meanwhile, the electrode mixture may have a thickness of 20 to 150 μm. Generally, an electrode current collector may have a thickness of 3 to 100 μm, and accordingly, a thickness of the electrode mixture may be varied. When the electrode mixture has a thickness of greater than 150 μm, a current collector and a mixture may be detached, and an electrode mixture may be cracked. On the other hand, when the electrode mixture has a thickness of less than 20 μm, a small amount of an active material is added to an electrode layer, and thus the amount and dispersion uniformity of a conductive material are not a great concern.

According to the present invention, a method of preparing an electrode mixture includes preparing a pre-dispersed slurry by mixing a binder and a conductive material with an organic solvent; preparing an electrode slurry by adding an electrode active material to the pre-dispersed slurry; applying the electrode slurry on a current collector; and drying the electrode slurry applied on the current collector.

Meanwhile, when a cross-section of the electrode mixture is imaged such that a pixel filled 100% with the conductive material among a plurality of divided pixels is considered to be a condensed pixel and a value obtained by counting condensed pixels is considered to be a degree of agglomeration, a degree of agglomeration of the conductive material in the electrode mixture has a standard deviation of less than 3.0.

Types and contents of the conductive material, binder and electrode active material have been described above, and thus the descriptions thereof will be omitted.

As described above, a degree of agglomeration of a conductive material in the electrode mixture may be improved by a method of preparing a slurry upon preparation of the electrode mixture and/or by adjusting coating and drying temperatures when a slurry is applied on a current collector.

The method of preparing an electrode mixture according to the present invention includes preparing a pre-dispersed slurry by mixing a binder and a conductive material with an organic solvent.

The pre-dispersed slurry may be prepared by first mixing a binder and a conductive material with an organic solvent without addition of an electrode active material. In this case, the pre-dispersed slurry may have a solid content of 5 to 15 wt %.

Generally, when minimum amounts of a conductive material and a binder to be included in an electrode mixture are added, a solid content may be at least 5 wt %. When a solid content is greater than 15 wt % due to addition of an excessive amount, the viscosity of an electrode slurry is too high when an electrode active material is added later, and thus an electrode slurry may be not uniformly applied when being applied on a current collector. However, this problem can be solved by adding an additional solvent or adjusting an amount of an electrode active material added, and thus may not be a critical problem.

The method of preparing an electrode mixture according to the present invention includes preparing an electrode slurry by adding an electrode active material to the pre-dispersed slurry.

The pre-dispersed slurry in which a conductive material and a binder are uniformly dispersed is prepared, and an electrode active material is added thereto to prepare an electrode slurry. In this case, the solid content of a final electrode slurry may be adjusted to become about 50 to 80 wt %, preferably, 60 to 70 wt %.

As such, when an electrode mixture is prepared by including a process of preparing a pre-dispersed slurry of a conductive material and a binder by dispersing an electrode active material later, not together with a conductive material and a binder, a conductive material is more uniformly dispersed, and thus the standard deviation and maximum value of a degree of agglomeration of a conductive material may be low, and accordingly, electrode resistance and resistance of the cell itself are lowered. Therefore, the output and lifespan characteristics of the battery may be finally improved.

The method of preparing an electrode mixture according to the present invention includes applying and drying the electrode slurry on an electrode current collector.

The process of applying an electrode slurry on a current collector may be performed by a coating method generally used in the art.

After the applying process, a process of drying the electrode slurry applied on an electrode current collector at an appropriate temperature may be performed. In this case, the drying process may be performed at 110 to 150° C., preferably, 120 to 140° C. When the drying process is performed at less than 110° C., N-methyl-2-pyrrolidone (NMP), widely used as an organic solvent, is not sufficiently dried and a small amount of NMP remains in an electrode, which has adverse effects on performance of the battery. On the other hand, when the drying process is performed at greater than 150° C., a solvent in an electrode coating layer moves too fast, and thus a conductive material and a binder move to a surface of a coating layer together with a solvent to be dried, that is, a conductive material and a binder are not uniformly distributed in the electrode. Further, it is preferable to adjust a drying temperature to 120 to 140° C. to lower a degree of agglomeration of a conductive material in an electrode mixture, but a drying temperature is not particularly limited as long as it is in a range of 110 to 150° C., and may be applied as a processing condition.

According to another embodiment of the present invention, there is provided an electrode which includes the above-described electrode mixture; and an electrode current collector.

The electrode mixture has been described above, and thus the descriptions thereof will be omitted. The electrode mixture may preferably be a positive electrode mixture.

The electrode current collector may preferably be a positive electrode current collector, and the positive electrode current collector may be generally prepared with a thickness of 3 to 100 µm. Such a positive electrode current collector is not particularly limited as long as it does not cause a chemical change in the battery and has high conductivity. For example, the positive electrode current collector may be stainless steel, aluminum, nickel, titanium, calcined carbon, or aluminum or stainless steel whose surface is treated with carbon, nickel, titanium, or silver. The current collector may have fine irregularities at a surface thereof to increase adhesion of the positive electrode active material. In addition, the current collector may be used in any of various forms such as a film, a sheet, a foil, a net, a porous material, a foam and a non-woven fabric.

According to still another embodiment of the present invention, there is provided a lithium secondary battery which uses the above-described electrode as a positive electrode. The lithium secondary battery includes a positive electrode; a negative electrode; and a separator interposed between the positive electrode and the negative electrode.

Specifically, the positive electrode is prepared as described above, and a filler may be further included in the mixture as necessary. The filler is optionally used as a component to inhibit expansion of a positive electrode, and is not particularly limited as long as it is a fibrous material that does not cause a chemical change in the battery. For example, the filler may be an olefin-based polymer such as polyethylene, polypropylene or the like; or a fibrous material such as glass fiber, carbon fiber or the like.

In addition, the negative electrode is prepared by applying and drying a negative electrode active material on a negative electrode current collector, and the above-described components may be further included as necessary.

The negative electrode current collector is generally prepared with a thickness of 3 to 500 µm. Such a negative electrode current collector is not particularly limited as long as it does not cause a chemical change in the battery and has high conductivity. For example, the negative electrode current collector may be copper, stainless steel, aluminum, nickel, titanium, calcined carbon, or copper or stainless steel whose surface is treated with carbon, nickel, titanium, silver, an aluminum-cadmium alloy or the like. In addition, the negative electrode current collector, like the positive electrode current collector, may have fine irregularities at a surface thereof to increase adhesion of the negative electrode active material. In addition, the negative electrode current collector may be used in any of various forms such as a film, a sheet, a foil, a net, a porous material, a foam and a non-woven fabric.

The negative electrode active material includes amorphous carbon or crystalline carbon. Specifically, the negative electrode active material may be carbon such as hard carbon, graphite-based carbon or the like; a metal composite oxide such as $Li_xFe_2O_3$ ($0=X=1$), $Li_xWO_2$ ($0=X=1$), $Sn_xMe_{1-x}Me'_yO_z$ (Me: Mn, Fe, Pb, Ge; Me': Al, B, P, Si, group 1, group 2 and group 3 elements in the periodic table, halogen elements; $0<x=1$; $1=y=3$; $1=z=8$) or the like; lithium metal; a lithium alloy; a silicon-based alloy; a tin-based alloy; an oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$ or the like; a conductive polymer such as polyacetylene or the like; or a Li—Co—Ni-based material.

The separator, which insulates electrodes, between the positive electrode and the negative electrode may be a commonly known polyolefin-based separator or a composite separator in which an organic and inorganic composite layer is formed on an olefin-based substrate, but the present invention is not particularly limited thereto.

An electrode current collector with the above-described structure is stored in a pouch casing, and then an electrolyte solution is injected to manufacture a battery.

The electrolyte solution is a lithium salt-containing non-aqueous electrolyte, which is composed of a non-aqueous electrolyte and lithium. The non-aqueous electrolyte may be a non-aqueous electrolyte solution, a solid electrolyte, an inorganic solid electrolyte or the like.

The non-aqueous electrolyte solution may be, for example, an aprotic organic solvent such as N-methyl-2-pyrrolidinone, propylene carbonate, ethylene carbonate, butylene carbonate, dimethyl carbonate, diethyl carbonate, γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, a phosphoric acid triester, trimethoxymethane, a dioxolane derivative, sulfolane, methylsulfolane, 1,3-dimethyl-2-imidazolidinone, a propylene carbonate derivative, a tetrahydrofuran derivative, ether, methyl propionate, ethyl propionate or the like.

The organic solid electrolyte may be, for example, a polyethylene derivative, a polyethylene oxide derivative, a polypropylene oxide derivative, a phosphoric acid ester polymer, poly agitation lysine, polyester sulfide, polyvinyl alcohol, polyvinylidene fluoride, a polymer including an ionic dissociable group or the like.

The inorganic solid electrolyte may be, for example, a nitride, a halide or a sulfate of lithium (Li) such as $Li_3N$, $LiI$, $Li_5NI_2$, $Li_3N$—$LiI$—$LiOH$, $LiSiO_4$ $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$ or the like.

The lithium salt is a material that is readily soluble in the non-aqueous electrolyte, and may be, for example, $LiCl$, $LiBr$, $LiI$, $LiClO_4$ $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonate, lithium tetraphenylborate, an imide or the like. In addition, in order to improve charge/discharge characteristics and flame retardancy, for example, pyridine, triethyl phosphite, triethanolamine, cyclicethers, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. In some cases, the non-aqueous electrolyte may further include a halogen-containing solvent such as carbon tetrachloride, ethylene trifluoride and the like to impart incombustibility, and may further include carbon dioxide gas to improve high-temperature storage characteristics.

The invention claimed is:

1. A method of preparing an electrode mixture, comprising:
    preparing a pre-dispersed slurry by mixing a binder and a conductive material with an organic solvent;
    preparing an electrode slurry by adding an electrode active material to the pre-dispersed slurry;
    applying the electrode slurry on a current collector; and
    drying the electrode slurry applied on the current collector,
    wherein, when a cross-section of the electrode mixture is imaged such that a pixel filled 100% with the conductive material among a plurality of divided pixels is considered to be a condensed pixel and a value obtained by counting condensed pixels is considered to be a degree of agglomeration, the degree of agglomeration of the conductive material in the electrode mixture in a depth direction of the electrode mixture has a standard deviation of less than 3.0, and a maximum degree of agglomeration of the conductive material is less than 10,
    wherein the conductive material has a DBP absorption amount of 218 to 267 ml/100 g; a particle diameter of 25 to 35 nm; and a BET specific surface area of 50 to 135 $m^2/g$.

2. The method of claim 1, wherein the pre-dispersed slurry has a solid content of 5 to 15 wt %.

3. The method of claim 1, wherein the electrode slurry has a solid content of 50 to 70 wt %.

4. The method of claim 1, wherein the drying is performed at 110 to 150° C.

5. The method of claim 1, wherein the drying is performed at 120 to 140° C.

* * * * *